dann ......................... 260/40 R
United States Patent [19]

Kastelic

[11] 4,394,498

[45] Jul. 19, 1983

[54] METHOD FOR PROVIDING PARTICULATES OF LIQUID CRYSTAL POLYMERS AND PARTICULATES PRODUCED THEREFROM

[75] Inventor: John R. Kastelic, Rockaway, N.J.

[73] Assignee: Celanese Corporation, New York, N.Y.

[21] Appl. No.: 295,339

[22] Filed: Aug. 24, 1981

[51] Int. Cl.$^3$ .................... B29D 27/00; C08G 63/18; B02C 11/08
[52] U.S. Cl. ..................................... 528/193; 241/21; 241/23; 260/40 R; 264/28; 264/54; 264/140
[58] Field of Search ............. 260/40 R, 40 P; 241/21, 241/23; 528/193; 264/28, 51, 54, 140

[56] References Cited

U.S. PATENT DOCUMENTS

| | | | |
|---|---|---|---|
| 2,582,327 | 1/1952 | Haine | 241/21 X |
| 2,686,738 | 8/1954 | Teeters | 241/21 X |
| 3,006,561 | 10/1961 | Eberl et al. | 241/21 X |
| 3,198,645 | 8/1965 | Plunguian | 241/21 X |
| 3,275,250 | 9/1966 | Plunguian | 241/21 |
| 4,051,112 | 9/1977 | Kuratsuji et al. | 264/140 X |
| 4,161,470 | 7/1979 | Calundann | 260/40 P |
| 4,184,996 | 1/1980 | Calundann | 264/40 R |
| 4,238,598 | 12/1980 | Favstritsky | 528/193 |
| 4,238,599 | 12/1980 | Langley et al. | 528/193 |
| 4,256,624 | 3/1981 | Calundann | 260/40 R |
| 4,278,623 | 7/1981 | Niegisch | 264/28 |

OTHER PUBLICATIONS

Jackson; W. J., Jr. and H. F. Kuhfuss, "Liquid Crystal Polymers. I. Preparation of p-Hydroxybenzoic Acid Copolyesters." In *Journal of Polymer Science* Polymer Chemistry Edition, vol. 14, pp. 2043–2058, (1976).
Jackson; W. J., Jr. and H. F. Kuhfuss, "Liquid Crystal Polymers. III. Preparation and Properties of Poly(ester Amides) from p-Aminobenzoic Acid and Poly(ethylene Terephthalate)," In *Journal of Applied Polymer Science*, vol. 25, pp. 1685–1694, (1980).
Brydson; J. A., "Plastic Materials," Princeton, N.J., D. Van Nostrand, ©1966, pp. 33–44.

*Primary Examiner*—Philip E. Anderson
*Attorney, Agent, or Firm*—Burns, Doane, Swecker & Mathis

[57] ABSTRACT

A method is provided for the production of a powder comprised of particulates of a liquid crystal polymer. The powders of such polymers are uniquely suited for use in temperature and chemical resistant coatings. The particulates are formed by providing foamed articles of liquid crystal polymers and subsequently masticating the articles to form the desired particulates.

26 Claims, No Drawings

METHOD FOR PROVIDING PARTICULATES OF LIQUID CRYSTAL POLYMERS AND PARTICULATES PRODUCED THEREFROM

BACKGROUND OF THE INVENTION

The present invention relates to powders comprised of thermotropic liquid crystal polymer particulates and a method of production of such particulates.

The excellent chemical resistance and high temperature stability of thermotropic liquid crystal polymers can desirably be put to good use in protective coatings. See, for example, commonly-assigned U.S. Pat. Nos. 4,238,598 and 4,238,599. However, as a class, these materials are not easily ground into a fine powder suitable for use in such coatings. The high polymeric orientation which is so prevalent in these materials, irrespective of the manner of processing, leads to fragments of a very high aspect ratio which tend to clump and tangle rather than flow. Cryogenic grinding, which is conventionally used to produce powders of thermoplastic materials, is costly. Furthermore, the surprising toughness which thermotropic liquid crystal polymers possess at cryogenic temperatures make this type of grinding exceedingly slow.

OBJECTS AND SUMMARY OF THE INVENTION

It is therefore an object of the present invention to provide an efficient method of providing particulates of thermotropic liquid crystal polymers.

It is further an object of the present invention to provide a method of providing particulates of thermotropic liquid crystal polymers wherein grinding can be conducted under ambient conditions.

It is still further an object of the present invention to provide particulates of thermotropic liquid crystal polymers exhibiting a low aspect ratio.

It is also an object of the present invention to overcome the disadvantages of the prior art discussed above.

In accordance with one aspect of the present invention, there is provided a method of providing particulates of a thermotropic liquid crystal polymer which comprises providing a foamed melt of the polymer, forming a shaped article comprised of the polymer which contains a multitude of voids, and masticating the shaped article to an extent sufficient to form the desired particulates.

In accordance with another aspect of the present invention, there are also provided particulates of liquid crystal polymers formed according to the above method.

DETAILED DESCRIPTION OF THE INVENTION

It has been surprisingly and unexpectedly found that particulates of a thermotropic liquid crystal polymer suitable for use in a powder coating can be easily and efficiently provided by masticating shaped articles of a foamed thermotropic liquid crystal polymer. The multitude of voids which are present in such foamed articles enable the fibers to be readily broken up into powder-size particulates in the form of flakes, etc. having a desirably low aspect ratio (i.e., low ratio of length to diameter).

Thermotropic liquid crystal polymers are polymers which are liquid crystalline (i.e., anisotropic) in the melt phase. These polymers have been described by various terms, including "liquid crystalline", "liquid crystal" and "anisotropic". Briefly, the polymers of this class are thought to involve a parallel ordering of the molecular chains. The state wherein the molecules are so ordered is often referred to either as the liquid crystal state or the nematic phase of the liquid crystalline material. These polymers are prepared from monomers which are generally long, flat and fairly rigid along the long axis of the molecule and commonly have chain-extending linkages that are either coaxial or parallel.

Such polymers readily form liquid crystals (i.e., exhibit anisotropic properties) in the melt phase. Such properties may be confirmed by conventional polarized light techniques whereby crossed polarizers are utilized. More specifically, the anisotropic melt phase may be confirmed by the use of a Leitz polarizing microscope at a magnification of 40X with the sample on a Leitz hot stage and under nitrogen atmosphere. The polymer is optically anisotropic; i.e., it transmits light when examined between crossed polarizers. Polarized light is transmitted when the sample is optically anisotropic even in the static state.

Thermotropic liquid crystal polymers include but are not limited to wholly aromatic polyesters, aromatic-aliphatic polyesters, aromatic polyazomethines, aromatic polyestercarbonates and wholly and non-wholly aromatic poly(esteramide)s. The aromatic polymers are considered to be "wholly" aromatic in the sense that each moiety present in the polymer contributes at least one aromatic ring to the polymer backbone and which enable the polymer to exhibit anisotropic properties in the melt phase. Such moieties include but are not limited to aromatic diols, aromatic amines, aromatic diacids, and aromatic hydroxy acids. Moieties which may be employed in the polymers suitable for use in the present invention (wholly or non-wholly aromatic) include but are not limited to the following:

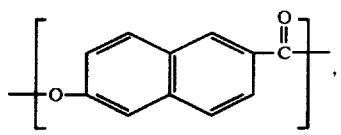

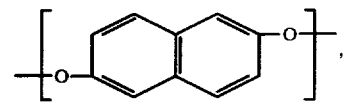

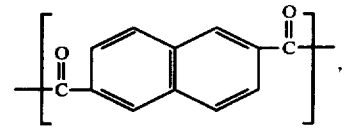

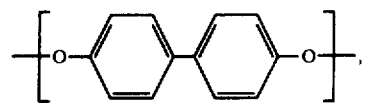

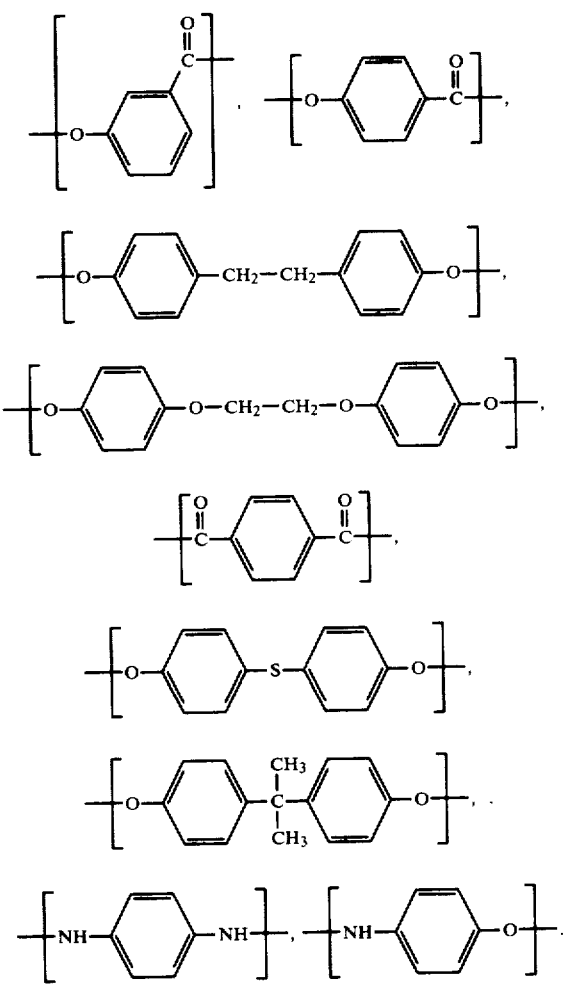

Specific examples of suitable aromatic-aliphatic polyesters are copolymers of polyethylene terephthalate and hydroxybenzoic acid as disclosed in *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1-4. A further disclosure of such copolymers can be found in "Liquid Crystal Polymers: I. Preparation and Properties of p-Hydroxybenzoic Acid Copolymers," *Journal of Polymer Science, Polymer Chemistry Edition*, Vol. 14, pp. 2043-58 (1976), by W. J. Jackson, Jr. and H. F. Kuhfuss. The above-cited references are herein incorporated by reference in their entirety.

Aromatic polyazomethines and processes of preparing the same are disclosed in the U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrilo-2-methyl-1,4-phenylenenitriloethylidyne-1,4-phenyleneethylidyne); poly(nitrolo-2-methyl-1,4-phenylenenitrilomethylidyne-1,4-phenylenemethylidyne); and poly(nitrilo-2-chloro-1,4-phenylenenitrilomethylidyne-1,4-phenylenemethylidyne).

Aromatic polyester-carbonates are disclosed in U.S. Pat. No. 4,107,143, which is herein incorporated by reference in its entirety. Examples of such polymers include those consisting essentially of p-oxybenzoyl units, p-dioxyphenyl units, dioxycarbonyl units, and terephthoyl units.

Aromatic polyester-amides and processes of preparing the same are disclosed in the U.S. Pat. No. 4,182,842. Further disclosure of such copolymers can be found in "Liquid Crystal Polymers: III Preparation and Properties of Poly(Ester Amides) from p-Aminobenzoic Acid and Poly(Ethylene Terephthalate)", *Journal of Applied Polymer Science*, Vol. 2 pp. 1685-1694 (1980), by W. J. Jackson, Jr. and H. F. Kuhfuss. The above-cited references are herein incorporated by reference in their entirety.

The liquid crystal polymers which are preferred for use in the present invention include thermotropic wholly aromatic polyesters. Recent publications disclosing such polyesters include (a) Belgian Pat. Nos. 828,935 and 828,936, (b) Dutch Pat. No. 7505551, (c) West German Pat. Nos. 2,520,819, 2,520,820, and 2,722,120, (d) Japanese Pat. Nos. 43-223, 2132-116, 3017-692, and 3021-293, (e) U.S. Pat. Nos. 3,991,013; 3,991,014; 4,057,597; 4,066,620; 4,075,262; 4,118,372; 4,146,702; 4,153,779; 4,156,070; 4,159,365; 4,169,933; 4,181,792; 4,188,476; 4,201,856; 4,226,970; 4,232,143; 4,232,144; 4,245,082; 4,238,600; and 4,247,514; and (f) U.K. Application No. 2,002,404.

Wholly aromatic polymers which are preferred for use in the present invention include wholly aromatic polyesters and poly(ester-amide)s which are disclosed in commonly-assigned U.S. Pat. Nos. 4,067,852; 4,083,829; 4,130,545; 4,161,470; 4,184,996; 4,238,599; 4,238,598; 4,230,817; 4,224,433; 4,219,461 and 4,256,624 and in commonly-assigned U.S. Application Ser. Nos. 91,003, filed Nov. 5, 1979 (now U.S. Pat. No. 4,337,191); Ser. No. 128,778, filed Mar. 10, 1980 (now U.S. Pat. No. 4,279,803); Ser. No. 128,759 filed Mar. 10, 1980 (now U.S. Pat. No. 4,299,756); and Ser. No. 214,557, filed Dec. 9, 1980 (now U.S. Pat. No. 4,330,457). The disclosures of all of the above-identified commonly-assigned U.S. patents are herein incorporated by reference in their entirety. The wholly aromatic polymers disclosed therein typically are capable of forming an anisotropic melt phase at a temperature below approximately 400° C.

The wholly aromatic polymers including wholly aromatic polyesters and poly(ester-amide)s which are suitable for use in the present invention may be formed by a variety of ester-forming techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acyloxy groups, acid halides, amine groups, etc. The organic monomer compounds may be reacted in the absence of a heat exchange fluid via a melt acidolysis procedure. They, accordingly, may be heated initially to form a melt solution of the reactants with the reaction continuing as said polymer particles are suspended therein. A vacuum may be applied to facilitate removal of volatiles formed during the final stage of the condensation (e.g., acetic acid or water).

Commonly-assigned U.S. Pat. No. 4,083,829, entitled "Melt Processable Thermotropic Wholly Aromatic Polyester," describes a slurry polymerization process which may be employed to form the wholly aromatic polyesters which are preferred for use in the present invention. According to such a process, the solid product is suspended in a heat exchange medium. The disclosure of this patent has previously been incorporated herein by reference in its entirety. Although that patent is directed to the preparation of wholly aromatic polyesters, the process may also be employed to form poly(ester-amide)s.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided. When poly(ester-amide)s are to be formed, an amine group may be provided as a lower acyl amide.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., BF$_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polymers suitable for use in the present invention tend to be substantially insoluble in common solvents and accordingly are not susceptible to solution processing. As discussed previously, they can be readily processed by common melt processing techniques. Most suitable wholly aromatic polymers are soluble in pentafluorophenol to a limited extent.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic poly(ester-amide)s which are preferred commonly exhibit a molecular weight of about 5,000 to 50,000 and preferably about 10,000 to 30,000, e.g., 15,000 to 17,000. Such molecular weight may be determined by standard techniques such as gel permeation chromatography as well as by techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters (as well as other thermotropic liquid crystal polymers) commonly exhibit an inherent viscosity (i.e., I.V.) of at least approximately 2.0 dl./g., e.g., approxiately 2.0 to 10.0 dl./g., when dissolved in a concentration of 0.1 percent by weight in pentafluorophenol at 60° C.

Especially preferred wholly aromatic polyesters are those which are disclosed in above-noted U.S. Pat. Nos. 4,161,470; 4,184,996; 4,219,461; 4,238,599; and 4,256,624 and Application Ser. No. 214,557 (now U.S. Pat. No. 4,330,457). Preferably, the wholly aromatic polyester comprises not less than about 10 mole percent of recurring units which include a naphthalene moiety. Such a moiety may include 6-oxy-2-naphthoyl, 2,6-dioxynaphthalene, and 2,6-dicarboxynaphthalene.

For the purposes of the present invention, the aromatic rings which are included in the polymer backbones of the polymer components may include substitution of at least some of the hydrogen atoms present upon an aromatic ring. Such substituents include alkyl groups of up to four carbon atoms, alkoxy groups having up to four carbon atoms, halogens, and additional aromatic rings such as phenyl and substituted phenyl. Preferred halogens include fluorine, bromine and chlorine. Although bromine atoms tend to be released from organic compounds at high temperatures, bromine is more stable on aromatic rings than on aliphatic chains, and therefore is suitable for inclusion as a possible substituent on the aromatic rings.

The wholly aromatic polyester which is disclosed in U.S. Pat. No. 4,161,470 is a melt processable wholly aromatic polyester capable of forming an anisotropic melt phase at a temperature below approximately 350° C. The polyester consists essentially of the recurring moieties I and II wherein:

I is 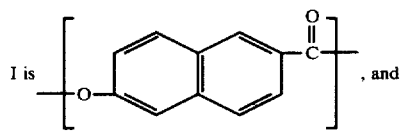, and

II is 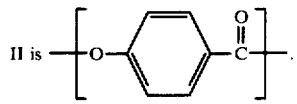.

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 75 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

The wholly aromatic polyester which is disclosed in U.S. Pat. No. 4,184,996 is a melt processable wholly aromatic polyester capable of forming an anisotropic melt phase at a temperature below approximate 325° C. The polyester consists essentially of the recurring moieties I, II, and III wherein:

I is 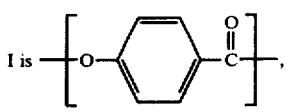,

II is 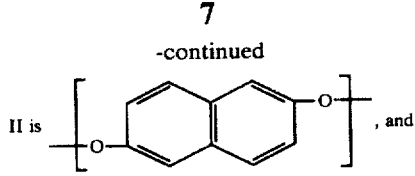, and

III is 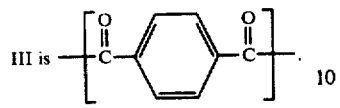.

The polyester comprises approximately 30 to 70 mole percent of moiety I. The polyester preferably comprises approximately 40 to 60 mole percent of moiety I, approximately 20 to 30 mole percent of moiety II, and approximately 20 to 30 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

The wholly aromatic polyester which is disclosed in U.S. Pat. No. 4,219,461 is a melt processable wholly aromatic polyester which is capable of forming an anisotropic melt phase at a temperature below approximately 320° C. and consists essentially of the recurring moieties I, II, III, and IV wherein:

I is 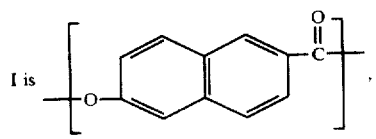,

II is 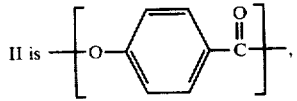,

III is a dioxyaryl moiety of the formula O+Ar+O where Ar is a divalent radical comprising at least one aromatic ring, and IV is a dicarboxy aryl moiety of the formula

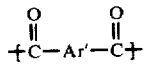

wherein Ar' is a divalent radical comprising at least one aromatic ring, and wherein said polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Moieties III and IV are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, non-symmetrical moieties, such as those derived from resorcinol and isophthalic acid, may also be used.

Preferred moieties III and IV are set forth in above-noted U.S. Pat. No. 4,219,461. The preferred dioxy aryl moiety III is:

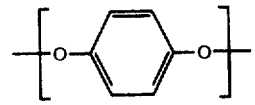

and the preferred dicarboxy aryl moiety IV is:

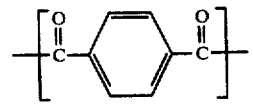

The wholly aromatic polyester which is disclosed in U.S. Pat. No. 4,238,599 is a melt processable polyester capable of forming an anisotropic melt phrase at a temperature no higher than approximately 320° C. consisting essentially of the recurring moieties I, II, III and IV wherein:

I is 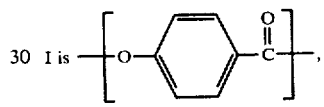,

II is 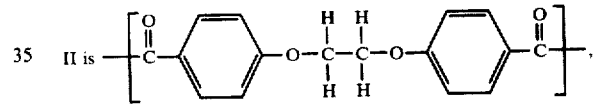,

III is 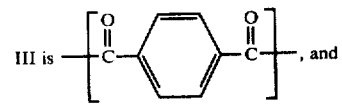, and

IV is 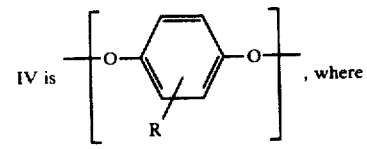, where

R is methyl, chloro, bromo, or mixtures thereof, and is substituted for a hydrogen atom present upon the aromatic ring, and wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV. The polyester preferably comprises approximately 35 to 45 mole percent of moiety I, approximately 10 to 15 mole percent of moiety II, approximately 15 to 25 mole percent of moiety III, and approximately 25 to 35 mole percent of moiety IV, with the proviso that the total molar concentration of moieties II and III is substantially identical to that of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof. This wholly aromatic polyester commonly exhibits an inherent viscosity of at least 2.0 dl./g., e.g., 2.0 to 10.0 dl./g., when dissolved in a concentration of 0.1 weight/volume percent in pentafluorophenol at 60° C.

The polyester disclosed in U.S. Pat. No. 4,256,624 is a melt processable wholly aromatic polyester which is capable of forming an anisotropic melt phase at a temperature below approximately 400° C. The polyester consists essentially of the recurring moieties I, II, and III wherein:

I is

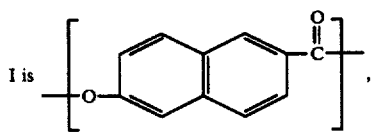,

II is a dioxy aryl moiety of the formula O—Ar—O where Ar is a divalent radical comprising at least one aromatic ring, and III is a dicarboxy aryl moiety of the formula

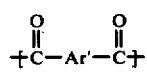

where Ar' is a divalent radical comprising at least one aromatic ring, and wherein the polyester comprises approximately 10 to 90 mole percent of moiety I, approximately 5 to 45 mole percent of moiety II, and approximately 5 to 45 mole percent of moiety III. The polyester preferably comprises approximately 20 to 80 mole percent of moiety I, approximately 10 to 40 mole percent of moiety II, and approximately 10 to 40 mole percent of moiety III. The polyester more preferably comprises approximately 60 to 80 mole percent of moiety I, approximately 10 to 20 mole percent of moiety II, and approximately 10 to 20 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

As with moieties III and IV of the polyester disclosed in U.S. Pat. No. 4,219,461, moieties II and III of the polyester described immediately above may be symmetrical or nonsymmetrical, but are preferably symmetrical.

Preferred moieties II and III are set forth in above-noted U.S. Pat. No. 4,256,624. The preferred dioxy aryl moiety II is:

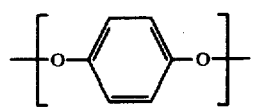

and the preferred dicarboxy aryl moiety III is:

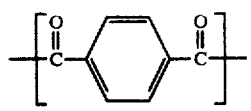

U.S. Application Ser. No. 214,557, filed Dec. 9, 1980 (now U.S. Pat. No. 4,330,457), discloses a melt processable poly(ester-amide) which is capable of forming an anisotropic melt phase at a temperature below approximately 400° C. The poly(ester-amide) consists essentially of the recurring moieties I, II, III and optionally IV wherein:

I is

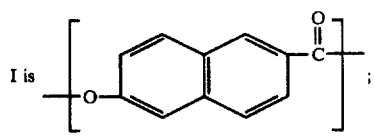;

II is

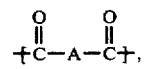, where A is a divalent radical comprising at least one aromatic ring or a divalent trans-cyclohexane radical;

III is Y—Ar—Z, where Ar is a divalent radical comprising at least one aromatic ring, Y is O, NH, or NR, and Z is NH or NR, where R is an alkyl group of 1 to 6 carbon atoms or an aryl group; and IV is O—Ar'—O, where Ar' is a divalent radical comprising at least one aromatic ring;

and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Preferred moieties II, III and IV are set forth in above-noted U.S. Application Ser. No. 214,557 (now U.S. Pat. No. 4,330,457). The preferred dicarboxy aryl moiety II is:

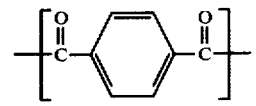

the preferred moiety III is:

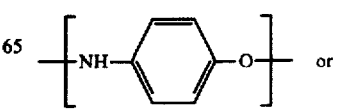 or

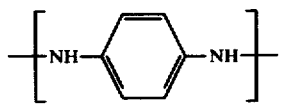

and the preferred dioxy aryl moiety IV is:

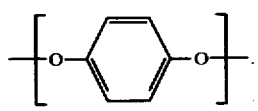

The powders of the present invention may be provided by masticating shaped articles (such as fibers) of thermotropic liquid crystal polymers. In order to enhance the propensity of the shaped article to form suitably fine powder-size particulates, the molten polymer is first foamed (e.g., with a suitable blowing agent) and then formed into a shaped article by an appropriate method such as by extrusion, injection molding, spinning, etc. For example, the foamed molten polymer may be spun into a fiber by conventional means such as melt spinning or spray spinning. The chemical blowing agent, if used, decomposes at the spinning temperature to release a gas such as nitrogen or carbon dioxide within the polymer melt to form the requisite foam prior to spinning.

While the use of fibers of the foamed polymer is preferred, it is also possible to use articles of other shapes and configurations. The term shaped article as used herein is intended to include particles, filaments, staple fibers, films, sheets and other extruded, molded, cast or otherwise formed shaped articles.

It should be noted, however, that the more highly oriented is the polymer in the article, the higher the aspect ratio of the powder particulates which are formed will be. It is therefore preferable to employ articles in the method of the present invention which are not highly oriented as a result of being formed.

The polymer need only be foamed to an extent sufficient to reduce the strength of the shaped article produced therefrom so as to enable the article to be easily broken into particulates. That is, a density reduction of no greater than about 50 percent in the article as a result of such foaming will normally be sufficient, with the density reduction preferably ranging between about 10 and about 20 percent. Such density reduction is based upon the density of an article comprised of an identical polymer in an unfoamed state.

The shaped article comprised of the foamed polymer thus will typically exhibit a density of about 0.1 to about 1.3 grams/cm³. Preferably, the density of the article will range from about 1.1 to about 1.3 grams/cm³. In addition, the melting temperature of the thermotropic liquid crystal polymer ranges from about 250° C. to about 340° C. depending upon the specific polymer employed.

Conventional high temperature blowing agents can be employed to produce the foamed polymers. For example, suitable blowing agents include but are not limited to those marketed commercially under the tradenames Expandex 5 PT (comprised of 5-phenyltetrazole and marketed by Stepan Chemical Co.), Ficel THT (comprised of trihydrazine triazine and marketed by Fisons Industrial Chemicals), Celogen HT 550 (comprised of a hydrazine derivative and marketed by Uniroyal Chemical) and Kemtec 500 (marketed by Sherwin-Williams Chemicals). Such blowing agents decompose at a temperature within the range of about 240° to 310° C.

The decomposition of the blowing agent is a function of temperature as well as time. It is important to match the decomposition temperature with the processing temperature of the polymer. If the blowing agent decomposes before the polymer melts sufficiently, poor cell structure may be attained. The amount of blowing agent required ranges between about 0.05 percent by weight to several percent depending upon the gas yield of the blowing agent. Preferably, the concentration of the blowing agent will range between about 0.1 and about 2 percent by weight.

In addition, with the proper selection of chemical blowing agent, the foaming action can be controlled by controlling the temperature and/or the pressure. However, control of the foaming action by temperature is more reliable than pressure.

It is also possible that a suitable gas could be blown into the polymer melt to provide the foamed polymer. However, it is more difficult to ensure adequate dispersion of the gas by such a method and the use of a blowing agent is thus preferred.

Various fillers may also be employed to enhance various characteristics of the foamed polymer articles, and ultimately, the resulting powder. For example, suitable stabilizers and plasticizers may be employed. In addition, other types of additives such as pigments, etc. may be added to provide a foamed polymer (and powder) of a specific color. A small amount of fine inorganic fillers such as talc or wollastonite may be employed to insure uniform nucleation. The amount of such fillers ranges approximately from 0.2 to 10 percent by weight and preferably ranges from about 0.5 to about 2 percent by weight.

The foamed polymer is preferably formed into fibers which may subsequently be broken up to provide the desired powder particulates. Any conventional spinning procedure can be employed. However, spray spinning is preferred since threadline stability with a foamed melt can be very poor.

For the purposes of the present invention, the use of a coarse fiber which exhibits a denier per filament (dpf) of between about 10 and about 50 is entirely acceptable. While fibers which are more fine (i.e., which exhibit a dpf ranging from about 1 to about 10) may be employed, their use is not essential and are generally employed only when it is desired to produce very small powder particulates with a minimum of grinding.

The shaped articles of the foamed thermotropic liquid crystal polymers are broken up by masticating the articles under suitable conditions to provide the desired powder. The term "masticating" as used herein is intended to include various mechanical processes whereby the shaped article is subjected to shearing or grinding forces of sufficient magnitude to break up the article. For example, treatment of a water slurry containing the shaped article in a Waring blendor has been found to be suitable. Wet grinding under ambient conditions (e.g., using a pellet grinder, grindstone mill or roll mill) is also suitable due to the fact that the polymer has been foamed prior to formation of the article. The foamed articles contain a myriad of microscopic voids and defects which enable the article to be easily broken up into powder-size particulates having a low aspect ratio (i.e., low ratio of length to diameter). Naturally, the masticating procedure can be carried out under various conditions (e.g., varied grinding time, etc.) whereby the size of the powder particulates can be varied. The use of wet milling or grinding is preferred since the slurry fluid prevents clumping of the particulates.

The effectiveness of the masticating step (as defined by the overall size of the powder particulates produced) is influenced by the degree of dispersion of the blowing agent (i.e., greater dispersion results in smaller gas cells which results in more effective grinding), the stability of the polymer to chemical degradation by the blowing agent and the draw down of the fiber during spinning (if employed). As noted previously, a low to moderate draw down is preferred to avoid the formation of particulates exhibiting high aspect ratios. Desirable draw downs range from about 5 to 20, preferably from about 5 to 10. It should further be noted that the effectiveness of the masticating step is also dependent to a certain degree upon the initial viscosity exhibited by the polymer, with polymers having a relatively low initial viscosity being more easily ground into particulates.

The powder which is formed can be subjected to screen analysis to classify and separate particulates of desired sizes. While particulates formed by the above-noted method will almost without exception be suitable for use in coatings, it is preferable for the maximum cross-sectional dimension of the particulates to range between about 0.1 microns to about 100 microns. It is also preferable for the length to diameter ratio (i.e., aspect ratio) to be less than or equal to about 10:1, and preferably less than about 5:1.

Coatings comprised of the powders of this invention can be formed by conventional methods. For example, the coating may be formed by electrostatic spraying or fluidized bed dip coating. The coating may also be formed merely by suspending the powder in a suitable carrier liquid (e.g., water) and then applying the mixture to the desired substrate by brushing, dipping or spraying. The coating is subsequently dried to remove the carrier liquid from the substrate and preferably heat fused to provide a coherent film which adheres to the substrate. Such heat fusion occurs at a temperature greater than the melting point of the specific thermotropic liquid crystal polymer employed. Generally, the temperature at which the fusion occurs need only be sufficiently in excess of the melting point of the polymer to enable the desired coherent film to be formed.

The powder of the liquid crystal polymer should be applied to the desired substrate in a thickness sufficient to provide a coherent, continuous coating upon fusion thereof. While the thickness of the particular coating will depend to a great extent upon the ultimate use for the coating, coatings of a thickness ranging from about 2 mils to about 4 mils are easily provided.

The coatings of the present invention can be easily and effectively applied to various substrates such as metal or ceramic (e.g., glass) substrates. The polymer adheres readily to a variety of surfaces upon fusion thereof.

Coatings comprised of thermotropic liquid crystal polymers exhibit excellent chemical and solvent resistance. They have high temperature resistance and high dielectric strength, i.e., they are capable of withstanding high voltages without exhibiting substantial breakdown. The coatings also possess superior flamability resistance and high oxygen index ratings.

The mechanical properties of powdered coatings produced in accordance with the present invention can be improved still further by subjecting the coating to a heat treatment following fusion thereof at a temperature sufficiently high to increase the melting point of the polymer in the coating. The heat treatment improves the properties of the article by increasing the molecular weight of the liquid crystalline polymer and increasing the degree of crystallinity thereof.

The coating may be thermally treated in an inert atmosphere (e.g., nitrogen, carbon dioxide, argon, helium) or alternatively, in a flowing oxygen-containing atmosphere (e.g., air). For instance, the coating may be brought to a temperature approximately 10 to 30 centigrade degrees below the melting temperature of the liquid crystal polymer, at which temperature the polymer remains a solid.

The duration of the heat treatment will commonly range from a few minutes to a number of days, e.g., from 0.5 to 200 hours, or more. Preferably, the heat treatment is conducted for a time of 1 to 48 hours and typically from about 5 to 30 hours.

Generally, the duration of heat treatment varies depending upon the heat treatment temperature; that is, a shorter treatment time is required as a higher treatment temperature is used. Thus, the duration of the heat treatment can be shortened for higher melting polymers, since high heat treatment temperatures can be applied without melting the polymer. The melting temperature of the liquid crystal polymer comprising the powder in the coating can be increased from between about 20 to about 50 centigrade degrees as a result of the heat treatment, with the amount of increase which is obtained being dependent upon the temperature used in the heat treatment, with higher heat treatment temperatures giving greater increases.

The chemical resistance of the coating also increases with heat treatment and the solubility into pentafluorophenol, one of the rare solvents for thermotropic liquid crystal polymers, continuously decreases with increasing heat treatment time and eventually the material does not dissolve even minimally (such as in amounts of 0.1 percent by weight).

It should, of course, be noted that the powders of the present invention are suitable for use in coatings which have not been subjected to fusion temperatures. That is, it may also be advantageous under certain circumstances to merely incorporate the powder as a filler in a suitable binder which possesses adhesive characteristics. The admixture may then be applied to the substrate to be coated. Upon drying or setting of the binder, a coating is provided which includes particulates of the liquid crystal polymer. Solvent, chemical and temperature resistance characteristics are thus provided by the coating in the same manner as provided by a coating of fused particles of the liquid crystal polymer. Flame resistance is also improved. Such particulates may also be heat treated prior to incorporation into the coating in the manner previously described.

The invention is additionally illustrated in connection with the following Example which is to be considered as illustrative of the present invention. It should be understood, however, that the invention is not limited to the specific details of the Example.

EXAMPLE

Separate 1000 gram batches of pellets of a thermotropic liquid crystal polymer comprised of 40 mole percent of a p-oxybenzoyl moiety and 60 mole percent of a 6-oxy-2-naphthoyl moiety are tumble coated with 5 grams and 30 grams of a Ficel THT blowing agent. The pellets are pre-coated with several drops of paraffin oil to increase adhesion of the blowing agent to the pellets. Each batch is then spray spun at a temperature of about 320° C. Fibers produced from each batch are weak and friable and exhibit a dpf ranging from about 25 to 50.

Samples of the fibers produced are masticated by various means including ball milling of fibers in wet and dry form, use of a Waring blender (with fibers in the form of an aqueous slurry), and use of a Ross & Son emulsifier (with fibers in the form of an aqueous slurry). The powder particulates produced by the various steps are dried and screened. The particulates which are produced range in size from about 5 to 25 microns in diameter and from about 25 to 200 microns in length. The particulates generally are of an aspect ratio of about 4:1. A small proportion of fines (less than about 5 percent on a numerical basis) are produced of about one micron in largest dimension.

The particulates are admixed with water to form a paste-like "paint" which is spread on various substrates including aluminum, stainless steel and glazed ceramic tile. Upon being air dried, the coatings are thermally bonded to the substrate by being heated to a temperature of 275° to 295° C. in an air oven for 10 to 30 minutes. Satisfactory coatings which exhibit good adhesion are obtained.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A method of providing particulates of a polymer which is capable of forming an anisotropic melt phase and suitable for use in a thermally and chemically resistant coating which method comprises providing a foamed melt of said polymer, forming an article comprised of said polymer which contains a multitude of voids, and masticating said article to an extent sufficient to form particulates of said polymer.

2. The method of claim 1 wherein said particulates exhibit a length to diameter ratio of less than about 10:1.

3. The method of claim 2 wherein said particulates exhibit a length to diameter ratio of less than about 5:1.

4. The method of claim 1 wherein the maximum cross-sectional dimension of said particulates ranges from about 0.1 to about 100 microns.

5. The method of claim 1 wherein the density of said article ranges from about 1.1 to about 1.3 gm/cm$^3$.

6. The method of claim 1 wherein said polymer is foamed by use of a blowing agent.

7. The method of claim 1 wherein the density of said article is reduced by up to about 50 percent as a result of being foamed in comparison to an article comprised of said polymer in an unfoamed state.

8. The method of claim 7 wherein the density of said article is reduced from about 10 to about 20 percent as a result of being foamed.

9. The method of claim 1 wherein said article is subjected to grinding at ambient conditions.

10. The method of claim 1 wherein said article is subjected to grinding at cryogenic conditions.

11. The method of claim 1 wherein said shaped article is in the form of a fiber.

12. The method of claim 1 wherein said shaped article is in the form of a sheet.

13. The method of claim 1 wherein said polymer is a wholly aromatic polymer.

14. The method of claim 1 wherein said polymer is a wholly aromatic polyester.

15. The method of claim 1 wherein said polymer comprises not less than about 10 mole percent of recurring units which include a naphthalene moiety.

16. The method of claim 14 wherein said naphthalene moiety of said wholly aromatic polyester is selected from the group consisting of a 6-oxy-2-naphthoyl moiety, a 2,6-dioxynaphthalene moiety, and a 2,6-dicarboxynaphthalene moiety.

17. The method of claim 14 wherein said polymer comprises a melt processable wholly aromatic polyester which is capable of forming an anistropic melt phase and consists essentially of the recurring moieties I, II, and III wherein:

I is 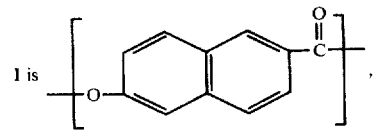

II is a dioxy aryl moiety of the formula O+Ar+O where Ar is a divalent radical comprising at least one aromatic ring, and III is a dicarboxy aryl moiety of the formula

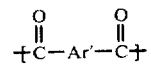

where Ar' is a divalent radical comprising at least one aromatic ring, and wherein said polyester comprises approximately 10 to 90 mole percent of moiety I, approximately 5 to 45 mole percent of moiety II, and approximately 5 to 45 mole percent of moiety III and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

18. The method of claim 17 wherein said polyester comprises approximately 20 to 80 mole percent of moiety I, approximately 10 to 40 mole percent of moiety II, and approximately 10 to 40 mole percent of moiety III.

19. The method of claim 14 wherein said wholly aromatic polyester comprises a melt processable wholly aromatic polyester which is capable of forming an anisotropic melt phase at a temperature below approximately 325° C. and consists essentially of the recurring moieties I, II, and III wherein:

I is 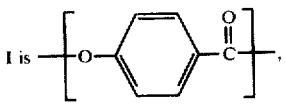

II is 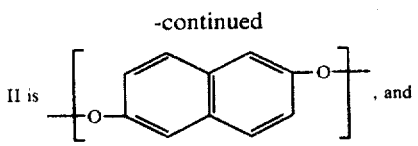, and

III is 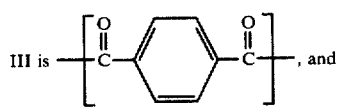, and wherein said polyester comprises approximately 30 to 70 mole percent of moiety I and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

20. The method of claim 14 wherein said wholly aromatic polyester comprises a melt processable wholly aromatic polyester which is capable of forming an anisotropic melt phase at a temperature below approximately 350° C. and consists essentially of the recurring moieties I and II wherein:

I is 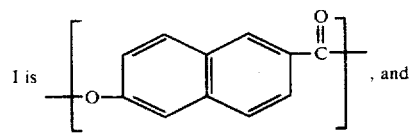, and

II is 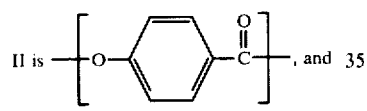, and wherein said polyester comprises approximately 10 to 90 mole percent of moiety I, and approximately 10 to 90 mole percent of moiety II and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

21. The method of claim 14 wherein said wholly aromatic polyester comprises a melt processable wholly aromatic polyester which is capable of forming an anisotropic melt phase at a temperature below approximately 320° C. and consists essentially of the recurring moieties I, II, III, and IV wherein:

I is 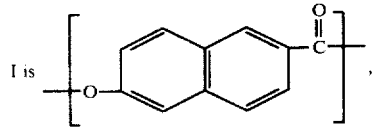,

II is 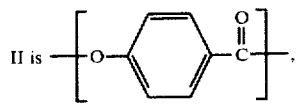,

III is a dioxyaryl moiety of the formula O—(—Ar—)—O where Ar is a divalent radical comprising at least one aromatic ring, and IV is a dicarboxy aryl moiety of the formula

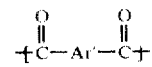

wherein Ar' is a divalent radical comprising at least one aromatic ring, and wherein said polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

22. The method of claim 14 wherein said wholly aromatic polyester comprises a melt processable wholly aromatic polyester which is capable of forming an anisotropic melt phase at a temperature below approximately 400°. and consists essentially of the recurring moieties I, II, and III wherein:

I is 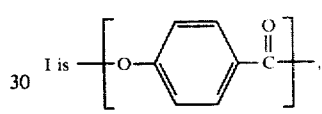,

II is 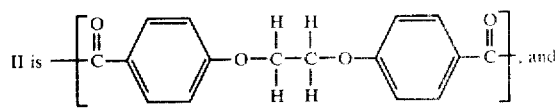, and

III is 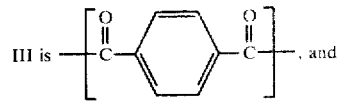, and

IV is 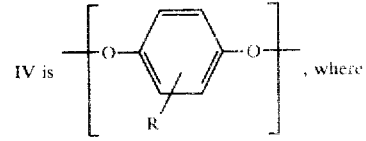, where

R is methyl, chloro, bromo, or mixtures thereof, and is substituted for a hydrogen atom present upon the aromatic ring, and wherein said polyester comprises approximately 20 to 60 mole percent of moiety I, approximately 5 to 18 mole percent of moiety II, and approximately 5 to 35 mole percent of moiety III and approximately 20 to 40 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

23. The method of claim 13 wherein said polymer comprises a melt processable poly(ester-amide) which is capable of forming an anisotropic melt phase and consists essentially of the recurring moieties, I, II, III and optionally IV wherein:

I is 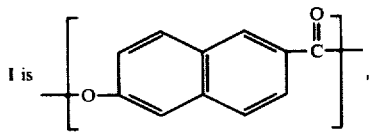,

II is

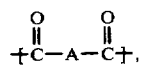, where A is a divalent radical comprising at least one aromatic ring or a divalent trans-cyclohexane radical;

III is Y—(Ar)—Z, where Ar is a divalent radical comprising at least one aromatic ring, Y is O, NH or NR, and Z is NH or NR, where R is an alkyl group of 1 to 6 carbon atoms or an aryl group; and IV is O—(Ar')—O, where Ar' is a divalent radical comprising at least one aromatic ring;

and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

24. Particulates of a polymer produced by the method of claim 1 which exhibit a length to diameter ratio of less than about 10:1 and a maximum cross-sectional dimension of less than about 100 microns.

25. The particulates of claim 24 which exhibit a length to diameter ratio of less than about 5:1.

26. The particulates of claim 24 which exhibit a maximum cross-sectional dimension ranging from about 0.1 to about 100 microns.

* * * * *